(No Model.)
S. WELLS.
POTATO PLANTER.
No. 466,207. Patented Dec. 29, 1891.
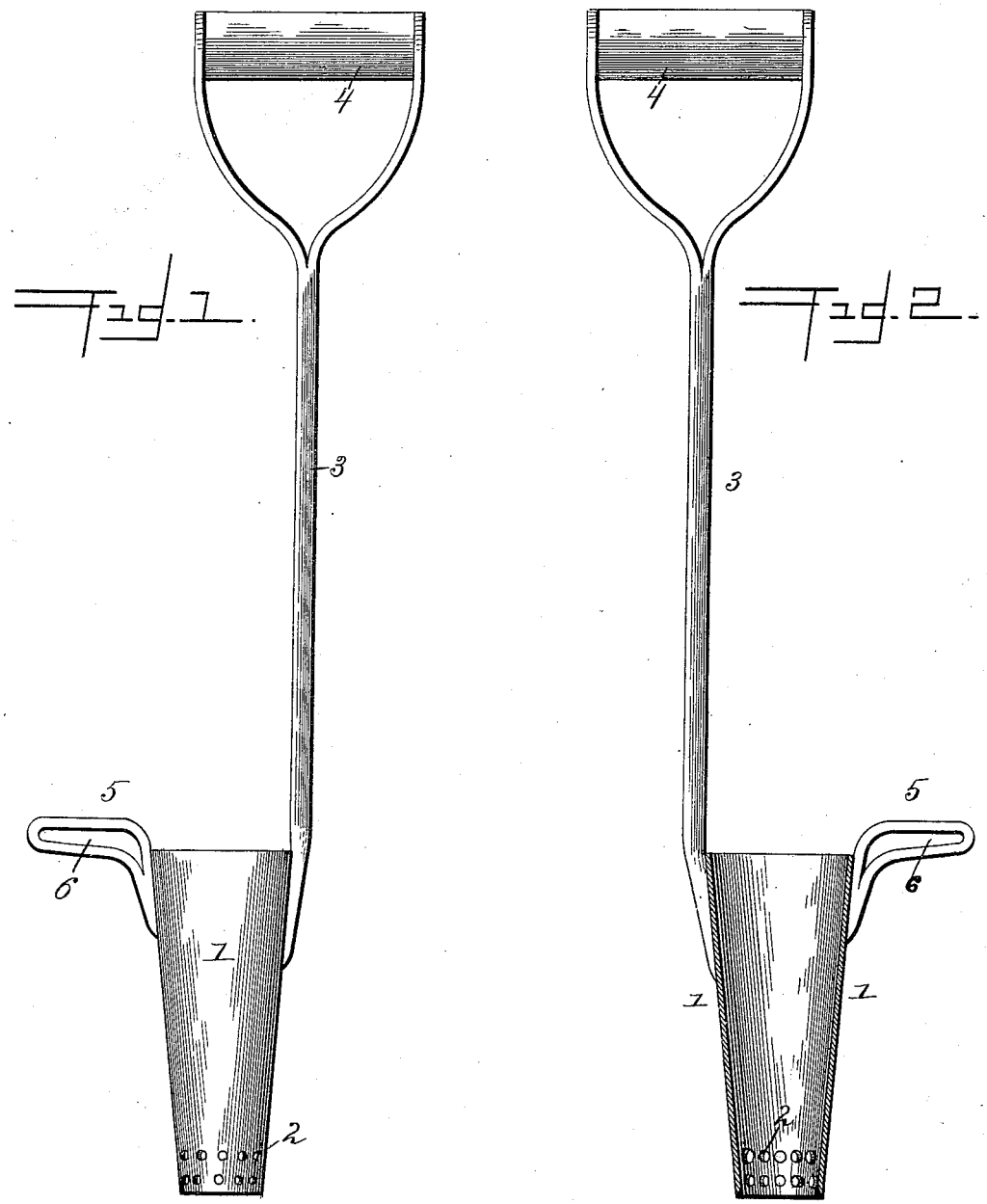
WITNESSES:
F. L. Ourand
St. L. Coombs
INVENTOR:
Sherman Wells,
by Sauis Bagger & Co.,
Attorneys.

UNITED STATES PATENT OFFICE.

SHERMAN WELLS, OF MANAWA, WISCONSIN.

POTATO-PLANTER.

SPECIFICATION forming part of Letters Patent No. 466,207, dated December 29, 1891.

Application filed April 17, 1891. Serial No. 389,302. (No model.)

*To all whom it may concern:*

Be it known that I, SHERMAN WELLS, a citizen of the United States, and a resident of Manawa, in the county of Waupaca and State of Wisconsin, have invented certain new and useful Improvements in Potato-Planters; and I do hereby declare that the following is a full, clear, and exact description of the invention, which will enable others skilled in the art to which it appertains to make and use the same, reference being had to the accompanying drawings, which form a part of this specification.

My invention relates to improvements in implements for forming holes in which to plant potatoes.

The object of the invention is to provide a novel construction of implement by means of which holes may be readily formed in the earth to receive seed-potatoes.

The invention consists in the novel construction and combination of parts hereinafter more fully described, and specifically pointed out in the claims.

In the accompanying drawings, Figure 1 is a side elevation of an implement constructed in accordance with my invention. Fig. 2 is a central vertical section of the same.

In the said drawings, the reference-numeral 1 designates a tapering metal cylinder having its lower or smaller end formed into a cutting-edge provided with a series of holes or apertures 2. This cylinder may be of cast-metal, or it may be made of sheet metal formed into proper shape, with its meeting edges joined together as may be found most convenient or desirable. At its upper end this cylinder is provided with an upwardly-extending rod 3, provided at its free end with a handle 4. The cylinder is also provided with an outwardly-projecting bar or arm 5, by means of which foot-pressure may be applied to drive the cylinder when the ground is hard. This bar or arm is provided with an opening 6 to receive the foot of the operator.

The operation will be readily understood. The cylinder is forced into the ground a proper distance and then withdrawn, the core cut by the cylinder in descent being withdrawn therewith by reason of the friction between it and the sides of the holes in the lower part of the cylinder. By inserting the foot in the opening of the arm or bar and lifting with the foot at the same time the lift is made with the handle the cylinder is withdrawn from the ground in a vertical direction, thereby rendering the operation less difficult and laborious than if the cylinder were simply raised by the handle, which would in that event tilt the cylinder to one side and cause it to bind or press against the earth in being withdrawn.

By my invention the holes for planting potatoes and other articles can be rapidly and efficiently formed.

Having thus described my invention, what I claim is—

1. An implement for forming holes for planting potatoes, consisting of the tapering cylinder having a series of holes at its lower end, the upwardly-extending rod provided with a handle, and the outwardly-extending foot-bar having a foot-opening therein, substantially as described.

2. An implement for forming holes for planting potatoes, consisting of a cylinder, a lifting-rod, and a foot-piece secured to the cylinder at a point opposite the lifting-rod and formed with a foot-opening, substantially as set forth.

In testimony that I claim the foregoing as my own I have hereunto affixed my signature in presence of two witnesses.

SHERMAN WELLS.

Witnesses:
FRANK CARLEY,
EMERY COHEN.